United States Patent
Halcrow et al.

(10) Patent No.: US 10,509,664 B1
(45) Date of Patent: Dec. 17, 2019

(54) DISTRIBUTED VIRTUAL MACHINE DISK IMAGE DEPLOYMENT

(71) Applicant: Google LLC, Mountain View, CA (US)

(72) Inventors: Michael A. Halcrow, Bellevue, WA (US); Brandon S. Baker, Redmond, WA (US); Nicholas V. Finco, Bothell, WA (US); Matthew Riley, Redmond, CA (US)

(73) Assignee: Google LLC, Mountain View, CA (US)

( * ) Notice: Subject to any disclaimer, the term of this patent is extended or adjusted under 35 U.S.C. 154(b) by 89 days.

(21) Appl. No.: 15/373,215

(22) Filed: Dec. 8, 2016

Related U.S. Application Data

(62) Division of application No. 14/201,219, filed on Mar. 7, 2014, now Pat. No. 7,537,745.

(51) Int. Cl.
| | |
|---|---|
| G06F 9/455 | (2018.01) |
| G06F 3/06 | (2006.01) |
| G06F 8/60 | (2018.01) |
| H04L 12/26 | (2006.01) |
| H04L 29/08 | (2006.01) |

(52) U.S. Cl.
CPC ........ *G06F 9/45558* (2013.01); *G06F 3/0604* (2013.01); *G06F 3/067* (2013.01); *G06F 3/0631* (2013.01); *G06F 3/0659* (2013.01); *G06F 3/0664* (2013.01); *G06F 8/60* (2013.01); *H04L 43/14* (2013.01); *H04L 67/1097* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 6,748,447 B1 * | 6/2004 | Basani | H04L 67/1095 709/219 |
| 8,301,686 B1 * | 10/2012 | Appajodu | G06F 9/5077 709/201 |
| 8,493,943 B1 * | 7/2013 | Segall | H04W 40/32 370/338 |

(Continued)

OTHER PUBLICATIONS

"VMware View 4.5 Linked Cloning explained," myvirtualcloud.net [online], Sep. 30, 2010 [retrieved on Nov. 7, 2013]. Retrieved from the internet: http://myvirtualcloud.net/?p=1222, 5 pages.

(Continued)

*Primary Examiner* — Bradley A Teets
(74) *Attorney, Agent, or Firm* — Fish & Richardson P.C.

(57) ABSTRACT

The present disclosure relates to a distributed disk image deployment during virtual machine instance creation, and to deploying a virtual machine instances based on disk image locality. On example method includes receiving, at a first computing node, a request to create a virtual machine instance, the request identifying a disk image to be associated with the virtual machine instance; determining a set of computing nodes from which to transfer the disk image on a locality of the first computing node to each computing node in the set of computing nodes, generating a set of requests for a plurality of portions of the disk image, sending at least one request from the set of requests to each computing node in the set of computing nodes; and receiving, from at least one of the set of computing nodes, one or more portions of the disk image.

12 Claims, 5 Drawing Sheets

(56) References Cited

U.S. PATENT DOCUMENTS

| | | | |
|---|---|---|---|
| 9,218,194 B2 | 12/2015 | Brant | |
| 9,300,548 B2 | 3/2016 | Asthana | |
| 9,311,128 B2 | 4/2016 | Freimuth | |
| 9,537,745 B1* | 1/2017 | Halcrow | G06F 9/455 |
| 2003/0035375 A1* | 2/2003 | Freeman | H04L 45/06 |
| | | | 370/238 |
| 2004/0153567 A1 | 8/2004 | Lichtenstein | |
| 2008/0144471 A1* | 6/2008 | Garapati | G06F 8/63 |
| | | | 369/99 |
| 2008/0195719 A1* | 8/2008 | Wu | H04L 67/10 |
| | | | 709/213 |
| 2010/0088699 A1* | 4/2010 | Sasaki | G06F 8/63 |
| | | | 718/1 |
| 2011/0119388 A1 | 5/2011 | Attanasio | |
| 2011/0243145 A1* | 10/2011 | Ryu | H04J 3/0682 |
| | | | 370/400 |
| 2012/0084768 A1* | 4/2012 | Ashok | G06F 9/45558 |
| | | | 717/174 |
| 2012/0102190 A1 | 4/2012 | Durham | |
| 2012/0179904 A1* | 7/2012 | Dunn | G06F 21/6209 |
| | | | 713/155 |
| 2013/0097304 A1 | 4/2013 | Asthana | |
| 2013/0227089 A1* | 8/2013 | McLeod | G06F 9/45558 |
| | | | 709/220 |
| 2013/0247036 A1 | 9/2013 | Fujiwara | |
| 2013/0290957 A1 | 10/2013 | Li | |
| 2013/0339643 A1 | 12/2013 | Tekade | |
| 2014/0040262 A1* | 2/2014 | Winter | G06F 17/30778 |
| | | | 707/737 |
| 2014/0149983 A1 | 5/2014 | Bonilla | |
| 2015/0278004 A1* | 10/2015 | Li | G11C 29/42 |
| | | | 714/6.11 |

OTHER PUBLICATIONS

Cheveresan et al., "SEsparse in VMware vSphere 5.5, Performance Study," Technical Whitepaper, VMware, Oct. 31, 2013.

Govindankutty, "View Storage Accelerator in VMware® View™ 5.1, Leveraging the Content-Based Read Cache in VMware vSphere™ 5.0 within VMware View 5.1," Technical Whitepaper, VMware, Oct. 8, 2012.

Peng et al., "VDN: Virtual Maching Image Distribution Network for Cloud Data Centers," 2012 Proceedings IEEE International Conference on Computer Communications (INFOCOM 2012), Mar. 2012, pp. 181-189.

Siebert, "Focus on Storage for Virtual Machines," TechTarget, E-book, Apr. 7, 2010, pp. 1-21.

* cited by examiner

DISTRIBUTED VIRTUAL MACHINE DISK IMAGE DEPLOYMENT

CROSS-REFERENCE TO RELATED APPLICATIONS

This application is a divisional application of, and claims priority to, U.S. patent application Ser. No. 14/201,219, titled "DISTRIBUTED VIRTUAL MACHINE DISK IMAGE DEPLOYMENT," filed on Mar. 7, 2014. The disclosure of the foregoing application is incorporated herein by reference in its entirety for all purposes.

BACKGROUND

A virtual machine is a software system that emulates a particular computer architecture. In large scale computing systems such as cloud systems, many virtual machine instances may be created in response to requests from clients of the system. Each virtual machine instance may be associated with an initial disk image representing the starting state of an emulated storage device associated with the instance. This disk image may store information needed for initialization of the virtual machine instance, such as the operating system to be executed by the instance.

SUMMARY

The present disclosure relates to a distributed disk image deployment during virtual machine instance creation. The disclosure also relates to deploying a virtual machine instances based on disk image locality.

In general, one innovative aspect of the subject matter described in this specification can be embodied in methods that include the actions of receiving a request to create a virtual machine instance, the request identifying a disk image to be associated with the virtual machine instance; determining one or more storage devices storing the disk image; determining a distance measurement between each of a plurality of computing nodes and the one or more storage devices storing the disk image; selecting a computing node from the plurality of computing nodes on which to create the virtual machine instance based at least in part on a locality of the computing node to a storage device from the one or more storage devices storing the disk image, the locality including the distance measurement between the computing node and the storage device; and creating the virtual machine instance on the computing node using the disk image from the storage device.

Other embodiments of this aspect include corresponding systems, apparatus, and computer programs, configured to perform the actions of the methods, encoded on computer storage devices.

By creating the virtual machine instance on a computing node that is local to a storage device storing the disk image, the disk image may be retrieved faster from the storage device during virtual machine instance creation, leading to increased speed and efficiency. Further, during times of high request volume, computing nodes may be selected for virtual machine instance creation based on the current load on the storage devices storing the disk image, the current load on the network links connecting the storage devices to the computing nodes, or other factors. Such intelligent selection may lead to increased efficiency and performance during virtual machine instance creation.

In general, one additional innovative aspect of the subject matter described in this specification can be embodied in methods, systems and computer-readable media configured to perform the operations of receiving, at a first computing node, a request to create a virtual machine instance, the request identifying a disk image to be associated with the virtual machine instance; determining a set of computing nodes from which to transfer the disk image based at least in part on a locality of the first computing node to each computing node in the set of computing nodes, the locality including a distance measurement between the first computing node and each other computing node; generating a set of requests for a plurality of portions of the disk image, each portion of the disk image including a sequential portion of data representing the disk image; sending at least one request from the set of requests to each computing node in the set of computing nodes; and receiving, from at least one of the set of computing nodes, one or more portions of the disk image.

In one aspect, the operations include creating the virtual machine instance at the first computing node after receiving all portions of the disk image from the set of computing nodes.

In another aspect, the operations include initiating creation of the virtual machine instance at the first computing node prior to receiving all of the disk image from the set of computing nodes; determining that the virtual machine instance needs a specific portion of the disk image that has not yet been received after initiating creation the virtual machine instance and prior to receiving all of the disk image from the set of computing nodes; generating a request for the specific portion of the disk image; sending the request to a computing node in the set of computing nodes; and receiving, from the computing node, the specific portion of the disk image.

In yet another aspect, the distance measurement is based at least in part on a network connectivity speed between the first computing node and each other computing node.

In some aspects, the operations include verifying authenticity of the one or more portions of the disk image upon receiving each portion of the disk image.

In another aspect, the operations include identifying one or more straggler portions of the disk image that have not been received from the set of computing nodes, each straggler portion associated with a request that was sent an amount of time ago that is greater than or equal to a threshold amount of time; and sending a request for each of the one or more straggler portions of the disk image to a plurality of computing nodes from the set of computing nodes.

Other embodiments of this aspect include corresponding systems, apparatus, and computer programs, configured to perform the actions of the methods, encoded on computer storage devices.

By transferring the disk image from multiple local computing nodes in parallel, faster virtual machine creation may be achieved, especially during periods of high request volumes. Load on dedicated disk image storage devices may also be reduced, leading to decreased server and bandwidth costs.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
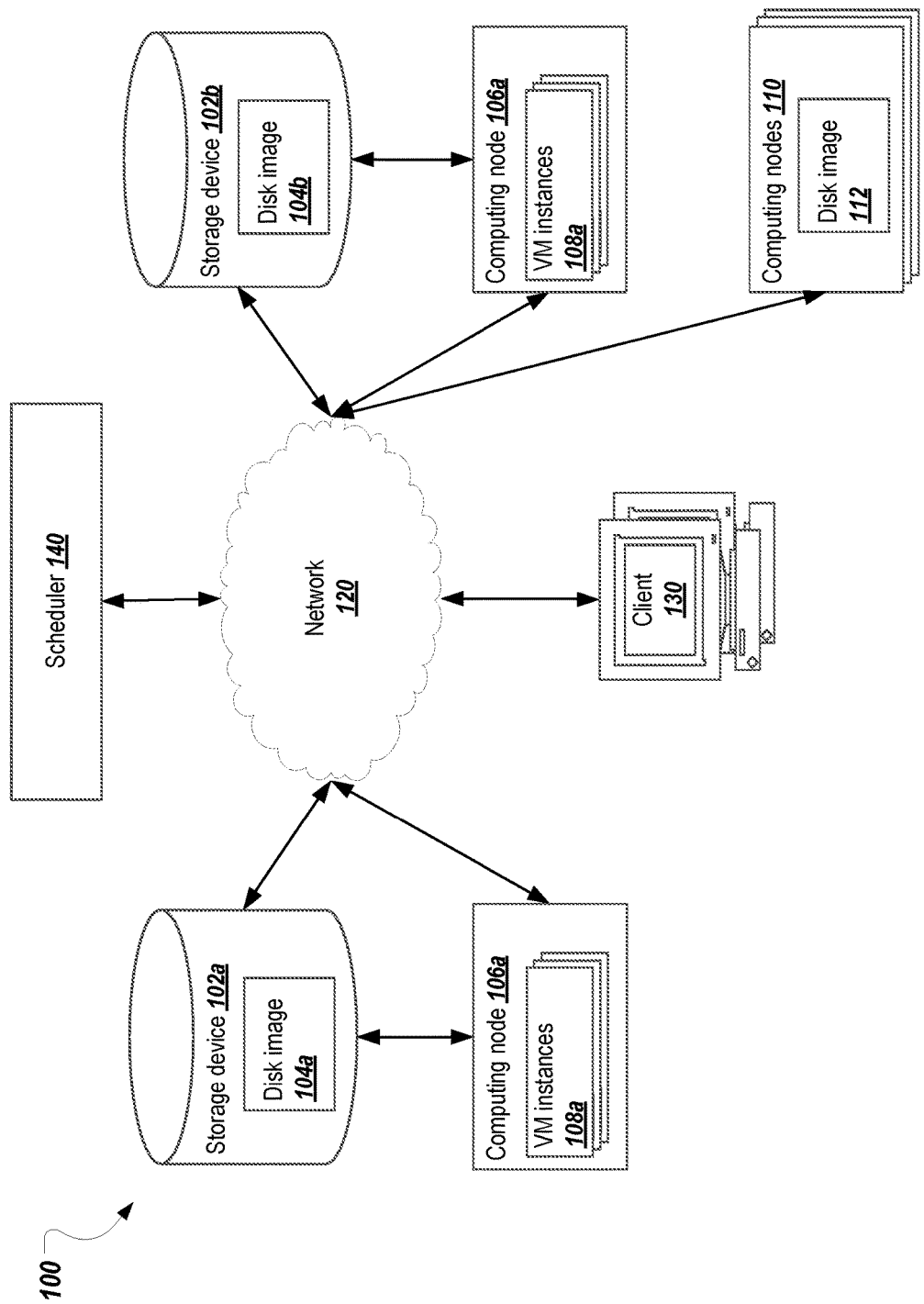
FIG. 1 is a block diagram of an environment in which distributed deployment of disk images to virtual machine instances can be implemented.

The present disclosure relates to distributed disk image deployment during virtual machine instance creation. The disclosure also relates to deploying virtual machine instances based on disk image locality.

In virtual computing environments, requests to create virtual machine instances may be received from various clients. When a request is received, a decision may be made as to how to create the requested virtual machine instance. Some virtual computing environments may include large numbers of computing nodes capable of running the requested virtual machine instance. In some cases, these computing nodes may be separated by large geographic distances and connected by data networks. A request to create a virtual machine instance may also designate an initial disk image for the virtual machine instance to be created. For example, this initial disk image may include the operating system to be executed in the virtual machine instance, applications to be made available within the instance, initial configuration information for the applications and operating system, or other information. In some cases, multiple requests may be received to create virtual machine instances with the same initial disk image. One approach to handling such requests may involve transferring the initial disk image from a central storage location to the computing node selected to run the virtual machine instance. Such an approach may lead to slow initialization times during periods of high request volume (known as "boot swarming"), as each computing node on which a virtual machine instance is created will attempt to retrieve the disk image independently from the central storage location. Other approaches may involve storing the disk image in multiple storage locations in the network. These approaches may provide increased performance over the centralized approach, but may still lead to slow initialization times during periods of high request volume.

Accordingly, the present disclosure describes an approach involving deploying a virtual machine instance to a computing node based on the locality of the requested disk image to the computing node. In one example method, a request to create a virtual machine instance is received that identifies a disk image to be associated with the virtual machine instance. One or more storage devices storing the disk image are then determined, as well as a distance measurement between the one or more storage devices storing the disk image. The distance measurement quantifies the ability of a storage device to respond to requests from a computing node for a disk image. Generally, a larger distance measurement between a computing node and a storage device indicates that the storage device will respond less quickly to requests from the computing node than a storage device with a smaller distance measurement, and/or may require more resources to support the response than required by a storage device with a small distance measurement. In some cases, the distance measurement may be a measurement of network connectivity speed between a computing node and a storage device. The distance measurement is used to measure locality of a storage device to a computing node, such that a storage device with a small distance measurement relative to a computing node is said to be "local to" or "near" the computing node.

After the distance measurements are determined, a computing node is selected on which to create the virtual machine instance based at least in part on the locality of the computing node to a storage device storing the disk image. This locality includes the distance measurement between the computing node and the storage device. The virtual machine instance is then created on the computing node using the disk image from the storage device.

By creating the virtual machine instance on a computing node that is local to (e.g., has fast network connectivity to) a storage device storing the disk image, the disk image may be retrieved faster from the storage device during virtual machine instance creation, leading to increased speed and efficiency. Further, during times of high request volume, computing nodes may be selected for virtual machine instance creation based on the current load on the storage devices storing the disk image, the current load on the network links connecting the storage devices to the computing nodes, or other factors. Such intelligent selection may lead to increased efficiency and performance during virtual machine instance creation.

The present disclosure also describes an approach involving distributed disk image deployment during virtual machine instance creation. In one example method, a first computing node receives a request to create a virtual machine instance identifying a disk image. A set of computing nodes from which to transfer the disk image is then determined based at least in part on a locality of the first computing node to each computing node in the set of computing nodes. A set of requests is generated for a plurality of portions of the disk image, each portion of the disk image including a sequential portion of the data representing the disk image. At least one request is then sent to each computing node in the set of computing nodes. One or more portions of the disk image are then received by the first computing node in response to requests.

By transferring the disk image from multiple local computing nodes in parallel, faster virtual machine creation may be achieved, especially during periods of high request volumes. Load on dedicated disk image storage devices may also be reduced, leading to decreased server and bandwidth costs.

FIG. 1 is a block diagram of an environment 100 in which distributed deployment of disk images to virtual machine instances can be implemented. As shown, the environment 100 includes a network 120 connecting a scheduler 140, one or more clients 130, one or more storage devices 102a-b, and one or more computing nodes 106 a-b and 110. In operation, the client 130 may request a virtual machine instance be created using a disk image, such as disk image 104a. The scheduler 140 may determine a computing node that is local to a storage device storing the disk image for the virtual machine instance to be created. For example, the scheduler 140 may select computing node 106a for creation of virtual machine instance using disk image 104a, because the computing node 106a is located near the storage device 102a storing the disk image 104a. In some implementations, the computing node 106a may be selected because it has network connectivity speed to the storage device 102a. By contrast, the computing node 106b is separated from the storage device 102a by the network 120, and may therefore have slower network connectivity speed to the storage device 102a than the computing node 106a.

In another example, the scheduler 140 may receive a request to create a virtual machine instance from the client 130. The scheduler 140 may select the computing node 106b to create the virtual machine instance, and direct the computing node 106b retrieve the disk image 112 from the computing nodes 110. The computing node 106b may send requests for portions of the disk image 112 to each of the computing nodes 110. The computing nodes 110 may respond to these requests with the requested portions of the disk image 112. By requesting the different portions of the disk image 112 in parallel from the computing nodes 110, the computing node 106b may retrieve the disk image 112 faster than requesting it from a single source, which may lead to faster virtual machine instance creation times, especially during times of high request volume.

The environment 100 includes a scheduler 140. In operation, the scheduler 140 may receive requests to create virtual machine instances, determine a computing node on which to create each instance, and instruct the computing node to create the instance and indicate a location from which the computing node may retrieve the disk image associated with the instance. In some implementations, the scheduler 140 may be a computing device or set of computing devices operable to receive the requests over the network 120 from clients 130. The scheduler 140 may receive the requests according to a network protocol or Application Programming Interface (API), such as, for example, Hypertext Transfer Protocol (HTTP), Simple Object Access Protocol (SOAP), Remote Procedure Call (RPC), GOOGLE COMPUTE ENGINE API, or other protocols or APIs.

In some implementations, the scheduler 140 may maintain an index storing the location of different disk images within the environment 100. The index may also include distance measurements from each of the computing nodes 106a-b and 110 to the various storage devices 102a-b storing the disk images. In some cases, the scheduler 140 may use these distance measurements to determine on which computing node to start a requested virtual machine instance. In some cases, the distance measurement may be an indication of network connectivity speed between the computing node and the storage device. This indication may be updated in real time in response to network conditions. For example, the scheduler 140 may receive updates of network activity, such as, for example, in the form of Simple Network Management Protocol (SNMP) messages, and may update the distance measurements to reflect these updates. The scheduler 140 may also receive updates from an external network management system. In some implementations, the distance measurement may include an indication of resource usage on a storage device, such as, for example, processor usage, memory usage, number of inbound connections, or other indications.

The environment 100 also includes one or more storage devices 102a-b. In some implementations, the storage devices 102a-b may be servers connected to the network 120 storing disk images. In some cases, the storage devices 102a-b may also function as computing nodes, such that they may be capable of creating and executing virtual machine instances. In some cases, the storage devices 102a-b may be part of a distributed storage system. The storage devices 102a-b may receive requests from the computing nodes 106a-b and 110 for stored disk images, and may return the requested disk images in response. Storage devices 102a-b may service requests for the disk images according to a network protocol or API, such as, for example, HTTP, SOAP, RPC, or other network protocols or APIs.

The storage devices 102a-b store disk images 104a-b. In operation, the storage devices 102a-b may store multiple disk images, and may organize the disk images using a database, a file system, or another mechanism. In operation, the disk images 104a-b include data to be included on an emulated disk associated with a created virtual machine instance. For example, the disk images 104a-b may include an operating system, applications to be made available by the virtual machine instance, configuration information, or other data. The disk images 104a-b may be stored according to a data format, such as, for example, ISO format, raw format, GZIP format, Virtual Hard Disk (VHD/VHDX) format, QEMU Copy On Write (QCOW/QCOW2) format, Virtual Machine Disk (VMDK) format, or other formats.

Environment 100 includes computing nodes 106a-b and 110. The computing nodes 106a-b and 110 may be computing devices operable to create and execute virtual machine instances upon request of the scheduler 140. In some implementations, the computing nodes 106a-b and 110 may include a hypervisor program operable to manage the running virtual machine instances. In some cases, the hypervisor program may retrieve the disk image associated with a particular virtual machine instance, and initialize the virtual machine instance once the disk image is received. In some implementations, the computing nodes 106a-b and 110 may receive requests from the scheduler 140 according to a network protocol or API, such as, for example, HTTP, SOAP, RPC, GOOGLE COMPUTE ENGINE API, or other network protocols or APIs.

In some implementations, the computing node 106a-b and 110 may retrieve the indicated disk image upon creation of a virtual machine instance. In some implementations, a computing node may retrieve the disk image from a storage device. For example, the computing node 106a may retrieve the disk image 104a from the storage device 102a in response to a request from the scheduler 140 to create a virtual machine instance using the disk image 104a. In some cases, the computing node may retrieve the disk image from other computing nodes. For example, the computing node 106b may retrieve the disk image 112 from the computing nodes 110 in response to a request from the scheduler 140 to create a virtual machine instance with the disk image 112. In some cases, the computing node 106b may request different portions of the disk image 112 in parallel from the computing nodes 110. This process is described in greater detail relative to FIG. 2. In some implementations, the computing node 106b may transfer the disk image 112 from the computing nodes 110 via an encrypted protocol, and may perform authenticity checking on the received disk image 112 after the transfer. Such an authenticity check may be performed in environments including computing nodes associated with different, possibly non-trusted entities.

The computing nodes 106a-b include one or more virtual machine instances 108a-b. Each virtual machine instance 108a-b may be an emulated representation of a particular computing device, and may include various applications executing within the virtual machine instance. Each virtual machine instance 108a-b maybe associated with various emulated components, such as one or more processors, one or more storage devices, memory devices such as Random Access Memory (RAM) or flash memory, or other emulated components.

Environment 100 also includes one or more clients 130. In operation, the clients 130 may request creation of virtual machine instances from the scheduler 140. The clients 130 may be computing devices connected to the network 120, and may request creation the virtual machine instances at the direction of users, software programs, or other entities. In some implementations, the clients 130 may be configured in a client/server relationship with the scheduler 140. The clients 130 may also be configured according to other relationships, such as, for example, peer-to-peer.

Figure 2:
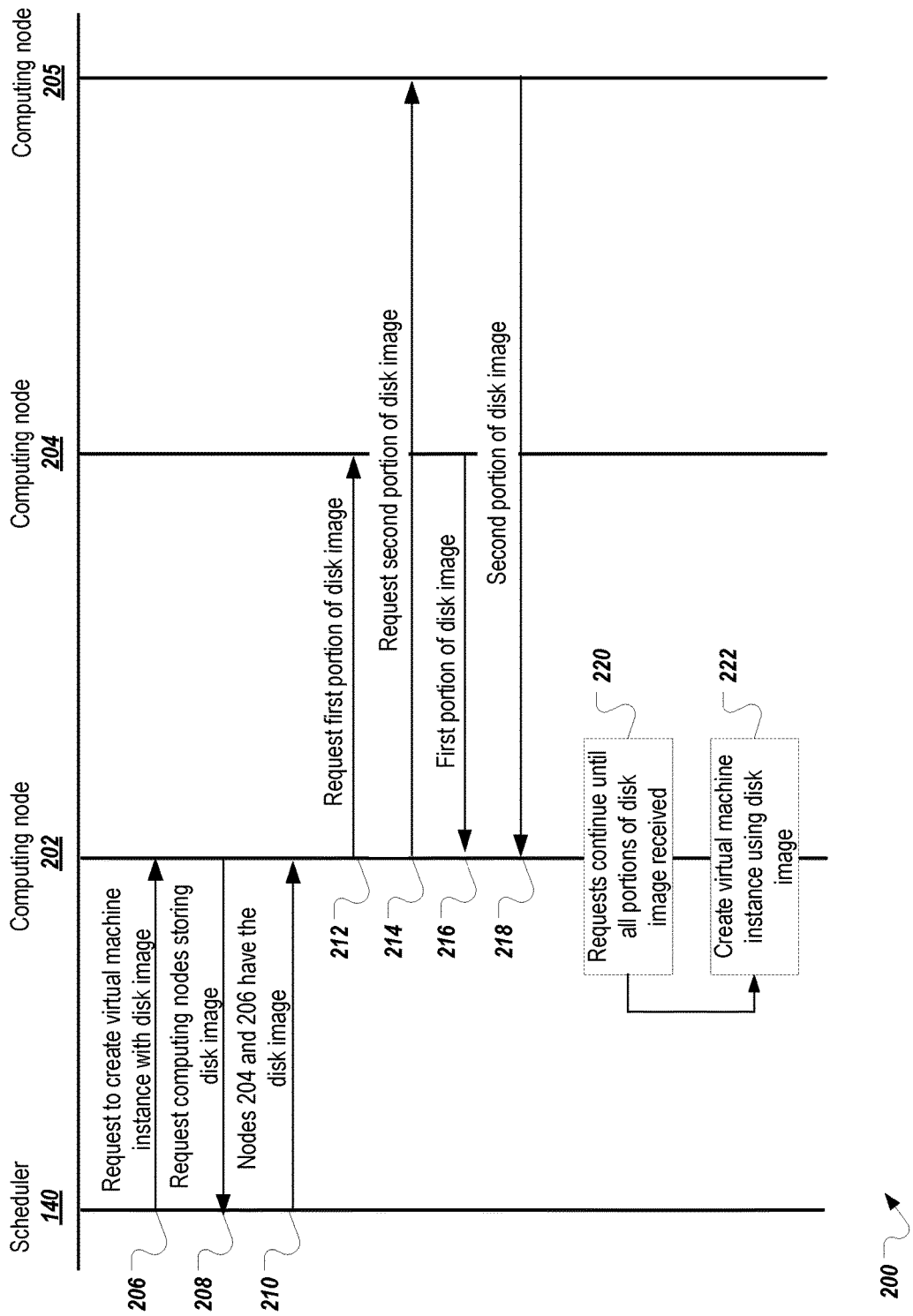
FIG. 2 is a message sequence diagram of in interaction in which a computing node retrieves a disk image for a virtual machine instance from multiple local computing nodes.

FIG. 2 is a message sequence diagram of an interaction 200 in which a computing node 202 retrieves a disk image for a virtual machine instance from multiple local computing nodes 204, 205 determined by the scheduler 140. At 206, the scheduler 140 sends a request to the computing node 202 to create a virtual machine instance with a particular disk image. In some implementations, the request is sent by the scheduler 140 in response to request from a client to create the virtual machine instance. The request may also be sent to the computing node 202 in response to the scheduler 140 determining that the computing node 202 is local to the requested disk image, as discussed relative FIG. 1.

At 208, the computing node 202 requests computing node storing the disk image from the scheduler 140. In some implementations, the computing node 202 may consult a different component than the scheduler 140 to make this determination, such as a tracker component (not shown).

At 210, the scheduler 140 sends indication to the computing node 202 that computing nodes 204 and 205 have the particular disk image. In some implementations, the scheduler 140 determines that the computing nodes 204 and 205 have the particular disk image by consulting a stored index indicating the location of the particular disk image. In some cases, the scheduler 140 may respond to the computing node 202 with an indication that the storage device has the particular disk image. In such a case, the computing node 202 may retrieve the disk image from the storage device rather than from other computing nodes. In some cases, the indication sent at 210 by the scheduler 140 may indicate a disk image transfer mode designating whether the computing node 202 should retrieve the disk image from multiple computing nodes or from a storage device.

At 212, the computing node 202 requests a first portion of the disk image from computing node 204. In some implementations, the first portion the disk image is identified by a byte range within the disk image to be retrieved. The first portion of the disk image may also be identified by a unique identifier provided by the scheduler 140. For example, in the response at 210, the scheduler 140 may provide a range of identifiers to the computing node 202 to be used to request portions of the disk image.

At 214, the computing node 202 requests a second portion of the disk image from the computing node 205. In some implementations, the request for the second portion of the disk image is sent while the request for the first portion of the disk image is pending. By sending multiple requests for multiple portions of the disk image to multiple computing nodes, the portions of the disk image may be transferred in parallel, may provide increased transfer speed.

In some implementations, the scheduler 140 may instruct the computing node 202 as to which portions of the disk image to request from the computing nodes 204, 205. For example, the scheduler 140 may provide a prioritized list of computing nodes to instruct computing node 202 to request portions of the disk image from the higher priority nodes first. The computing nodes 204, 205 may be ordered according to their respective distance measurements from the computing node 202, such that the nodes with lower measurements are given a higher priority. In some cases, the scheduler 140 may specifically instruct the computing node 202 as to which portions of the disk image to request from each of the computing nodes 204, 205. The scheduler 140 may also provide a tiered list of computing nodes from which to transfer the disk image, such that the computing node 202 will request portions from higher tier nodes first, and request from lower tier nodes if it does not receive a response.

And 216, the first portion of the disk image is received from the computing node 204. In 218, the second portion of disk image is received from the computing node 205. These actions may occur in any order. Upon receiving a first or second portion of the disk image, the computing node 202 continues to 220, an additional portion of the disk image is requested. This repeats until all portions of the disk image of been received from the computing nodes 204 and 205. At 222, the computing node 202 creates a virtual machine instance using the received disk image.

Figure 3:
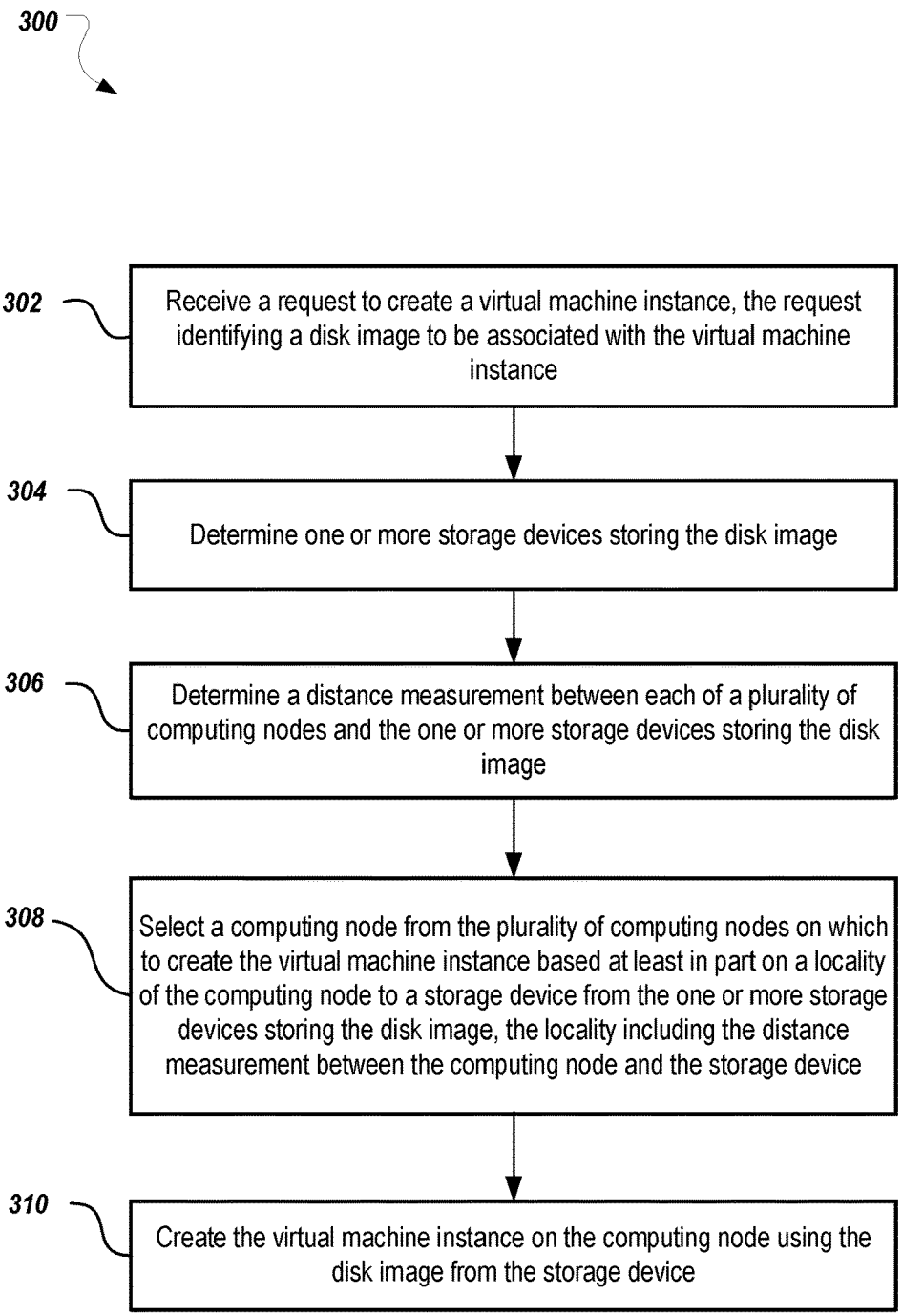
FIG. 3 is a flow diagram of an example process for deploying a virtual machine instance based on disk image locality.

FIG. 3 is a flow diagram of an example process for deploying a virtual machine instance based on disk image locality. At 302, a request to create a virtual machine instance is received, the request identifying a disk image to be associated with the virtual machine instance. At 304, one or more storage devices that are storing the disk image are determined. In some cases, determining one or more storage devices storing the disk image includes determining one or more computing nodes storing the disk image.

At 306, a distance measurement between each of the plurality of computing nodes in the one or more storage devices storing the disk image is determined. In some implementations, the distance measurement may be determined by observing current network conditions, such as network load or congestion. The distance measurement may also be determined based on observed response times associated with each of the one or more storage devices. In some cases, the distance measurement may be based on geographic distance between a computing node and storage device. The distance measurement may also be a compound measurement based on a combination of factors.

At 308, a computing node is selected from the plurality of computing nodes on which to create the virtual machine instance based at least in part on a locality of the computing node to a storage device from the one or more storage devices storing the disk image. The locality includes the distance measurement between the computing node and the storage device. In some cases, the distance measurement is based at least in part on a network connectivity speed between the storage device and the computing node. At 310, the virtual machine instance is created on the computing node using the disk image from the storage device.

In some cases, the disk image may be pre-loaded onto a subset of the one or more storage devices prior to the receiving the request to create the virtual machine instance, such as, for example, in response to determining a predicted demand for the disk image, in response to scheduling a planned outage for a subset of the one or more storage devices, or in response to other events or indications.

Figure 4:
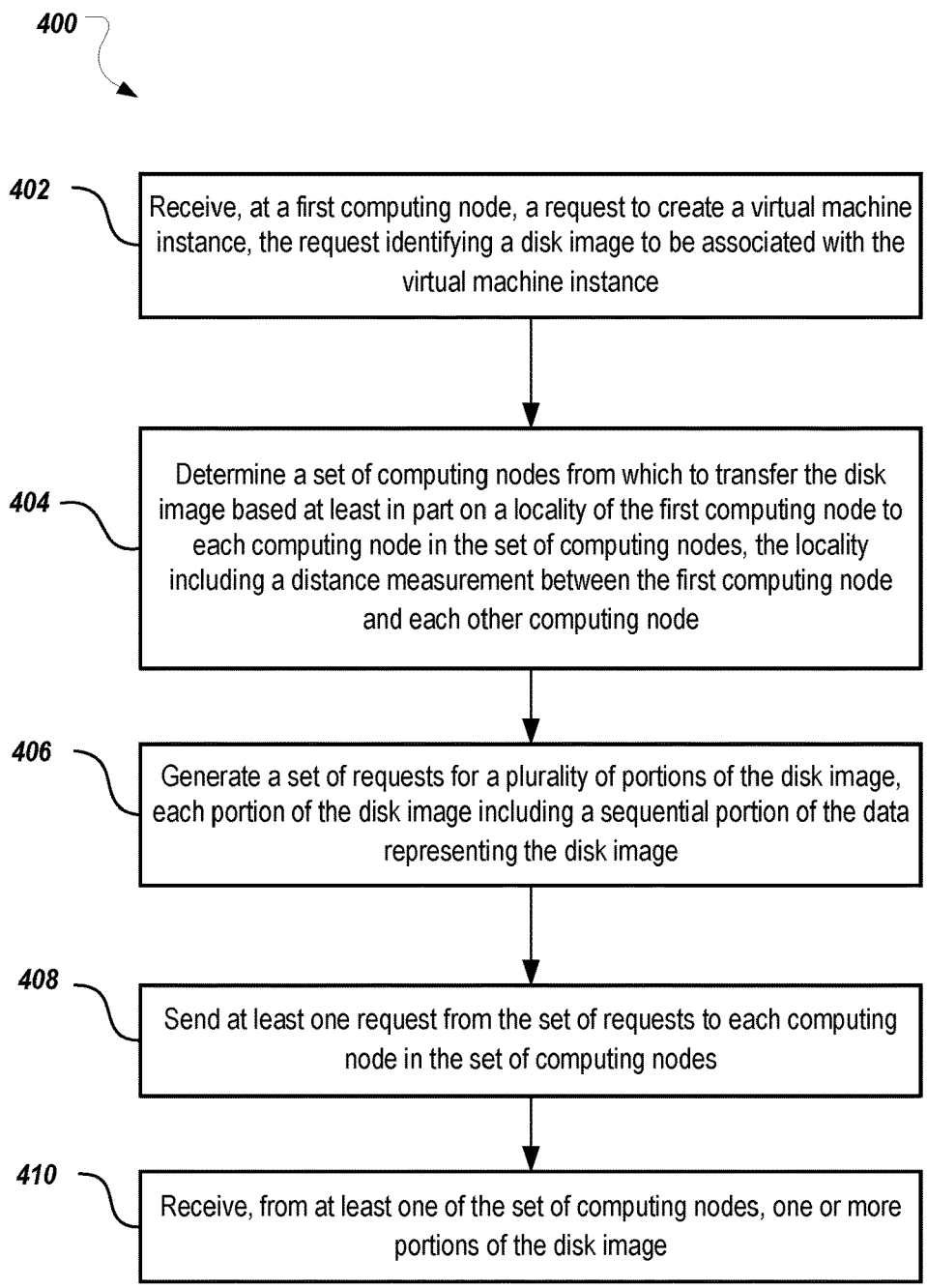
FIG. 4 is a flow diagram of an example process for retrieves a disk image for a virtual machine instance from multiple local computing nodes.

FIG. 4 is a flow diagram of an example process 400 for retrieves a disk image for a virtual machine instance from multiple local computing nodes. At 402, a request to create a virtual machine instance is received at a first computing node. The request identifies a disk image to be associated with the virtual machine instance.

At 404, a set of computing nodes from which to transfer the disk image is determined based at least in part on a locality of the first computing node to each computing node in the set of computing nodes. Locality includes a distance measurement between the first computing node and each other computing node. In some implementations, the distance measurement may be determined by observing current network conditions, such as network load or congestion. The distance measurement may also be determined based on observed response times associated with each of the one or more storage devices. In some cases, the distance measurement may be based on geographic distance between a computing node and storage device. The distance measurement may also be a compound measurement based on a combination of factors.

At 406, a set of requests is generated for a plurality of portions of the disk image, each portion of the disk image including a sequential portion of the data representing the disk image. At 408, at least one request from the set of requests is sent to each computing node in the set of computing nodes. At 410, one or more portions of the disk image are received from at least one of the set of computing nodes. In some cases, the virtual machine instance is created at the first computing node after receiving all portions of the disk image from the set of computing nodes.

In some implementations, creation of the virtual machine instance may be initiated at the first computing node prior to receiving all portions of the disk image from the set of computing nodes. In such a case, it may be determined that the virtual machine instance needs a specific portion of the disk image that has not yet been received after initiating creation the virtual machine instance and prior to receiving all of the disk image from the set of computing nodes. A request is generated for the specific portion of the disk image, and sent to a computing node in the set of computing nodes. The specific portion of the disk image is received from the computing node.

In some cases, requests may be sent to multiple computing nodes for straggler portions of the disk image, which are portions that have previously been requested but have yet to be received or are taking a long time to transfer. For example, a portion of the disk image that has not been received 10 seconds after being requested may be identified as a straggler portion. The straggler portions may be requested when the disk image is near completion so as to avoid waiting for the straggler portions after all other portions of the disk image have been received. For example, the straggler portions may be requested from other computing nodes when 10% or less of the disk image remains to be transferred.

Figure 5:
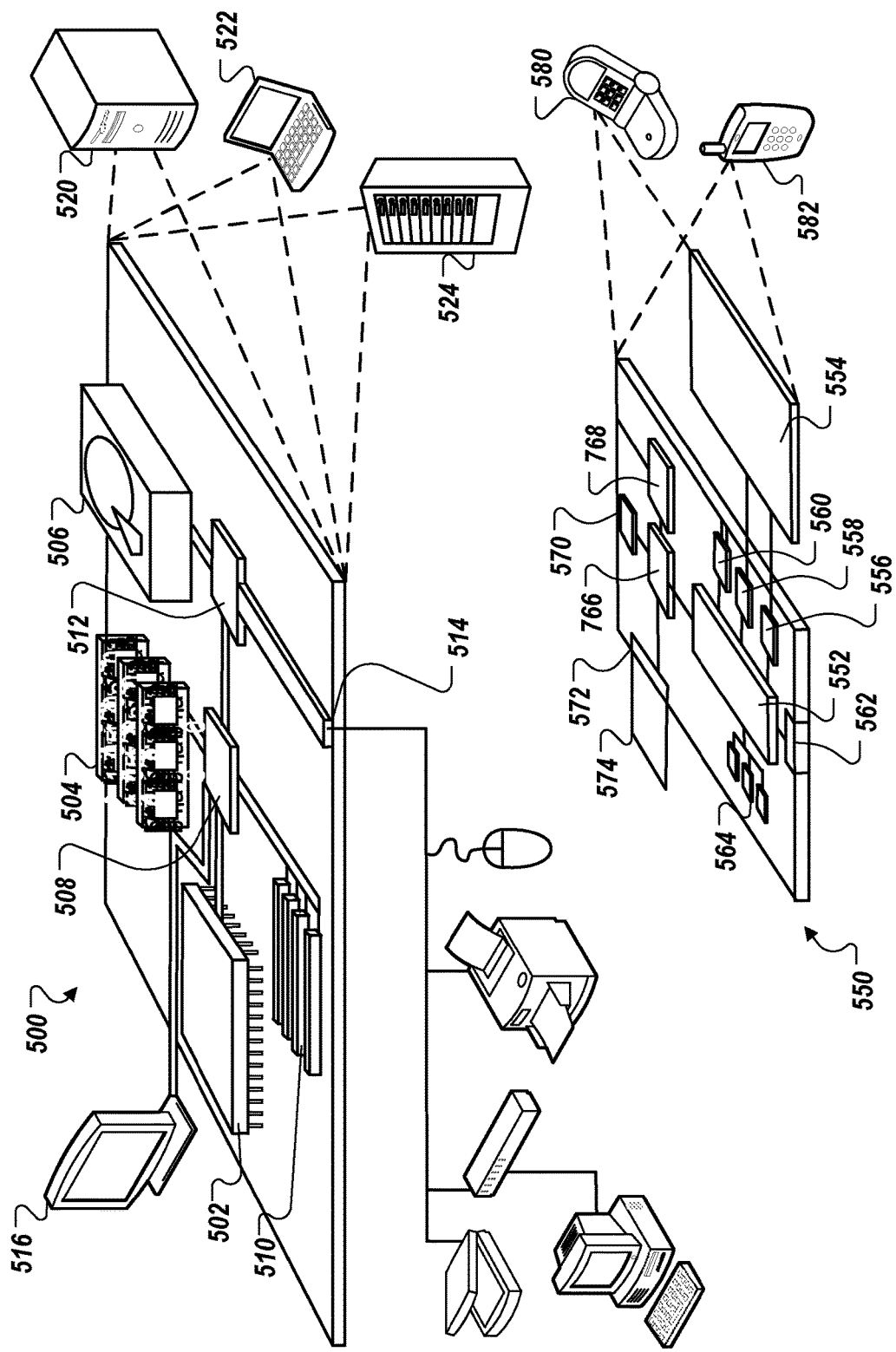
FIG. 5 is a block diagram of an example computing device.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed interface 508 manages bandwidth-intensive operations for the computing device 500, while the low speed interface 512 manages lower bandwidth-intensive operations. Such allocation of functions is exemplary only. In one implementation, the high-speed interface 508 is coupled to memory 504, display 516 (e.g., through a graphics processor or accelerator), and to high-speed expansion ports 510, which may accept various expansion cards (not shown). In the implementation, low-speed interface 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 552 may be a CISC (Complex Instruction Set Computers) processor, a RISC (Reduced Instruction Set Computer) processor, or an MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory 564 may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by one or more processors, the method comprising:
   receiving, at a first computing node, a request to create a virtual machine instance, the request identifying a disk image to be associated with the virtual machine instance;
   determining, based on the request to create a virtual machine instance, a locality of the first computing node to each computing node in a plurality of other computing nodes, wherein:
      the plurality of other computing nodes does not include the first computing node,
      the locality includes a distance measurement between the first computing node and each other computing node, and
      each respective distance measurement quantifies an ability of the first computing node to respond to each respective computing node in the plurality of other computing nodes for the disk image;
   determining, based on the determined locality of the first computing node to each computing node in the plurality of other computing nodes, a set of other computing nodes from which to transfer the disk image;
   generating a set of requests for a plurality of portions of the disk image, each portion of the disk image including a sequential portion of data representing a particular portion of the disk image;
   determining a prioritized list of each computing node in the set of other computing nodes according to the respective distance measurements for each computing node in the set of other computing nodes so that a second computing node that is prioritized higher than a third computing node is selected over the third computing node;
   sending, based on the prioritized list of the set of other computing nodes, at least one request from the set of requests to each computing node in the set of other computing nodes; and
   receiving, in parallel and from at least two computing nodes of the set of other computing nodes, two or more portions of the disk image, wherein at least one portion of the disk image from one of the at least two computing nodes is a different portion of the disk image received from another computing node of the at least two computing nodes.

2. The method of claim 1, further comprising creating the virtual machine instance at the first computing node after receiving all portions of the disk image from the set of other computing nodes.

3. The method of claim 1, further comprising:
   initiating creation of the virtual machine instance at the first computing node prior to receiving all of the disk image from the set of other computing nodes;
   determining that the virtual machine instance needs a specific portion of the disk image that has not yet been received after initiating creation the virtual machine instance and prior to receiving all of the disk image from the set of other computing nodes;
   generating a request for the specific portion of the disk image;
   sending the request to a computing node in the set of other computing nodes; and
   receiving, from the computing node, the specific portion of the disk image.

4. The method of claim 1, wherein the distance measurement is based at least in part on a network connectivity speed between the first computing node and each other computing node in the set of other computing nodes.

5. The method of claim 1, further comprising verifying authenticity of the one or more portions of the disk image upon receiving each portion of the disk image.

6. The method of claim 1, further comprising:
   identifying one or more straggler portions of the disk image that have not been received from the set of other computing nodes, each straggler portion associated with a request that was sent an amount of time ago that is greater than or equal to a threshold amount of time; and
   sending a request for each of the one or more straggler portions of the disk image to a plurality of computing nodes from the set of other computing nodes.

7. A system comprising:
   memory for storing data; and
   one or more processors operable to perform operations comprising:

receiving, at a first computing node, a request to create a virtual machine instance, the request identifying a disk image to be associated with the virtual machine instance;

determining, based on the request to create a virtual machine instance, a locality of the first computing node to each computing node in a plurality of other computing nodes, wherein:
- the plurality of other computing nodes does not include the first computing node,
- the locality includes a distance measurement between the first computing node and each other computing node, and
- each respective distance measurement quantifies an ability of the first computing node to respond to each respective computing node in the plurality of other computing nodes for the disk image;

determining, based on the determined locality of the first computing node to each computing node in the plurality of other computing nodes, a set of other computing nodes from which to transfer the disk image;

generating a set of requests for a plurality of portions of the disk image, each portion of the disk image including a sequential portion of data representing a particular portion of the disk image;

determining a prioritized list of each computing node in the set of other computing nodes according to the respective distance measurements for each computing node in the set of other computing nodes so that a second computing node that is prioritized higher than a third computing node is selected over the third computing node;

sending, based on the prioritized list of the set of other computing nodes, at least one request from the set of requests to each computing node in the set of other computing nodes; and receiving, in parallel and from at least two computing nodes of the set of other computing nodes, two or more portions of the disk image, wherein at least one portion of the disk image from one of the at least two computing nodes is a different portion of the disk image received from another computing node of the at least two computing nodes.

8. The system of claim 7, the operations further comprising creating the virtual machine instance at the first computing node after receiving all portions of the disk image from the set of other computing nodes.

9. The system of claim 8, the operations further comprising:
- initiating creation of the virtual machine instance at the first computing node prior to receiving all of the disk image from the set of other computing nodes;
- determining that the virtual machine instance needs a specific portion of the disk image that has not yet been received after initiating creation the virtual machine instance and prior to receiving all of the disk image from the set of other computing nodes;
- generating a request for the specific portion of the disk image;
- sending the request to a computing node in the set of other computing nodes; and
- receiving, from the computing node, the specific portion of the disk image.

10. The system of claim 7, wherein the distance measurement is based at least in part on a network connectivity speed between the first computing node and each other computing node in the set of other computing nodes.

11. The system of claim 7, the operations further comprising verifying authenticity of the one or more portions of the disk image upon receiving each portion of the disk image.

12. The system of claim 7, the operations further comprising:
- identifying one or more straggler portions of the disk image that have not been received from the set of other computing nodes, each straggler portion associated with a request that was sent an amount of time ago that is greater than or equal to a threshold amount of time; and
- sending a request for each of the one or more straggler portions of the disk image to a plurality of computing nodes from the set of other computing nodes.

* * * * *

UNITED STATES PATENT AND TRADEMARK OFFICE
CERTIFICATE OF CORRECTION

| | |
|---|---|
| PATENT NO. | : 10,509,664 B1 |
| APPLICATION NO. | : 15/373215 |
| DATED | : December 17, 2019 |
| INVENTOR(S) | : Halcrow et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 174 days.

Signed and Sealed this
Twenty-fourth Day of November, 2020

Andrei Iancu
*Director of the United States Patent and Trademark Office*